(12) United States Patent
Jin et al.

(10) Patent No.: US 11,394,425 B2
(45) Date of Patent: Jul. 19, 2022

(54) AMPLIFIER SUPPORTING FULL DUPLEX (FDX) OPERATIONS

(71) Applicant: Cisco Technology, Inc., San Jose, CA (US)

(72) Inventors: Hang Jin, Plano, TX (US); John T. Chapman, Coto de Caza, CA (US)

(73) Assignee: Cisco Technology, Inc., San Jose, CA (US)

( * ) Notice: Subject to any disclaimer, the term of this patent is extended or adjusted under 35 U.S.C. 154(b) by 924 days.

(21) Appl. No.: 15/956,902

(22) Filed: Apr. 19, 2018

(65) Prior Publication Data

US 2019/0326949 A1 Oct. 24, 2019

(51) Int. Cl.
| | | |
|---|---|---|
| H04B 3/20 | (2006.01) | |
| H04B 1/525 | (2015.01) | |
| H04L 5/14 | (2006.01) | |
| H04L 12/28 | (2006.01) | |

(52) U.S. Cl.
CPC ............... *H04B 3/20* (2013.01); *H04B 1/525* (2013.01); *H04L 5/1461* (2013.01); *H04L 12/2801* (2013.01)

(58) Field of Classification Search
CPC ......... H04B 3/20; H04B 1/525; H04L 5/1461; H04L 12/2801
See application file for complete search history.

(56) References Cited

U.S. PATENT DOCUMENTS

| | | | | |
|---|---|---|---|---|
| 6,212,273 | B1 * | 4/2001 | Hemkumar | H03G 3/3005 379/392 |
| 8,515,054 | B2 * | 8/2013 | LeBlanc | H04J 3/1688 379/406.03 |
| 8,588,073 | B2 * | 11/2013 | Li | H04L 67/322 370/235 |
| 9,338,278 | B2 * | 5/2016 | Kechichian | H04M 1/72418 |
| 9,589,556 | B2 * | 3/2017 | Gao | G10K 11/341 |
| 10,491,249 | B2 * | 11/2019 | Hewavithana | H04L 12/2801 |
| 10,763,957 | B2 * | 9/2020 | Krapp | H04B 10/25891 |
| 2009/0074177 | A1 * | 3/2009 | Takada | H04M 9/082 379/406.01 |
| 2012/0214432 | A1 * | 8/2012 | Kawasaki | H03F 1/0294 455/127.1 |
| 2014/0355708 | A1 * | 12/2014 | Kang | H04B 1/12 375/267 |
| 2017/0019146 | A1 * | 1/2017 | Jin | H04B 1/0475 |
| 2017/0237491 | A1 * | 8/2017 | Mutalik | H04N 7/22 398/115 |

(Continued)

*Primary Examiner* — Lisa Hashem
(74) *Attorney, Agent, or Firm* — Merchant & Gould P.C.

(57) ABSTRACT

Ringing suppression may be provided. First, a first ringing suppressor in a first branch of an amplifier may cancel interference from a second branch of the amplifier using a transmitted signal from the second branch as a reference. The first ringing suppressor may also cancel echo interference from the first branch of the amplifier using an output of the first ringing suppressor in the first branch as a reference. Furthermore, a second ringing suppressor in the second branch of the amplifier may cancel interference from the first branch of the amplifier using a transmitted signal from the first branch as a reference. Furthermore, the second ringing suppressor may cancel echo interference from the second branch of the amplifier using an output of the second ringing suppressor in the second branch as a reference.

20 Claims, 7 Drawing Sheets

(56) References Cited

U.S. PATENT DOCUMENTS

| | | | |
|---|---|---|---|
| 2018/0219577 A1* | 8/2018 | Zhang | H04B 3/23 |
| 2018/0343031 A1* | 11/2018 | Yagil | H04L 5/143 |
| 2019/0044555 A1* | 2/2019 | Hewavithana | H04B 3/20 |
| 2019/0386701 A1* | 12/2019 | Chapman | H04B 3/238 |
| 2020/0045166 A1* | 2/2020 | Furuta | G10L 25/24 |
| 2020/0313705 A1* | 10/2020 | Jin | H04B 10/612 |
| 2021/0314684 A1* | 10/2021 | Krapp | H04Q 11/0067 |

* cited by examiner

AMPLIFIER SUPPORTING FULL DUPLEX (FDX) OPERATIONS

TECHNICAL FIELD

The present disclosure relates generally to echo suppression.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
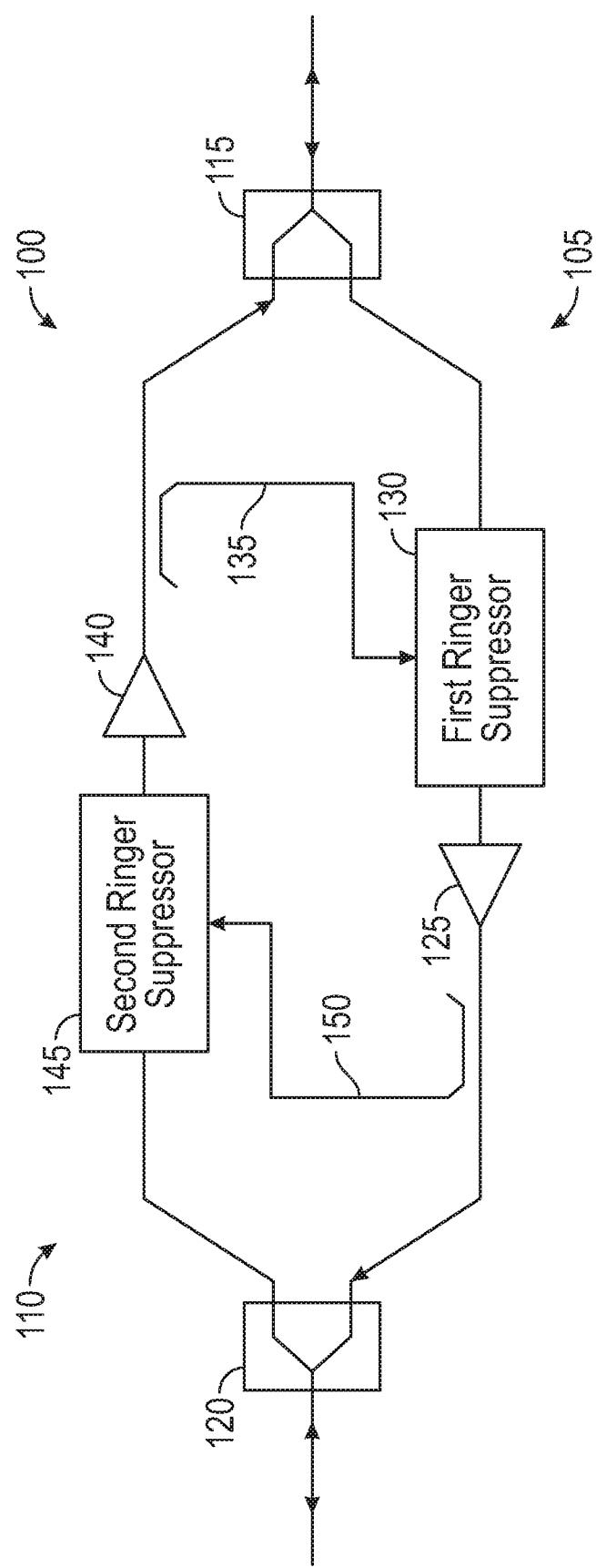
FIG. 1A is a block diagram of an amplifier supporting full duplex (FDX) operations.

Ringing suppression may be provided. First, a first ringing suppressor in a first branch of an amplifier may cancel interference from a second branch of the amplifier using a transmitted signal from the second branch as a reference. The first ringing suppressor may also cancel echo interference from the first branch of the amplifier using an output of the first ringing suppressor in the first branch as a reference. Furthermore, a second ringing suppressor in the second branch of the amplifier may cancel interference from the first branch of the amplifier using a transmitted signal from the first branch as a reference. Furthermore, the second ringing suppressor may cancel echo interference from the second branch of the amplifier using an output of the second ringing suppressor in the second branch as a reference.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. Fiber deep (FD) is a trend in which MSOs push fiber ever closer to customers to provide them with better service. With FD, MSOs may use nodes comprising Full Duplex (FDX) amplifiers in the HFC. FDX amplifiers amplify bi-directional full duplex traffic that may simultaneously use frequency spectrum in both the upstream (US) and downstream (DS) directions. However, with bi-directional full duplex traffic, interferences and echoes may occur in conventional amplifiers. Accordingly, embodiments of the present disclosure may provide interference and echo cancellation on both the US and DS directions. Embodiments of the disclosure may provide software, hardware architecture, and interference suppression processes for an amplifier that supports FDX operations.

FIG. 1A is a block diagram of a full duplex (FDX) amplifier 100 for providing FDX operations consistent with embodiments of the disclosure. As shown in FIG. 1A, FDX amplifier 100 may comprise a first branch 105, a second branch 110, a first coupler 115, and a second coupler 120. First branch 105 may comprise a first amplifier 125, a first ringing suppressor 130, and a second branch reference coupler 135. Second branch 110 may comprise a second amplifier 140, a second ringing suppressor 145, and a first branch reference coupler 150. To suppress reflections that may cause oscillations in FDX amplifier 100, the aforementioned ringing suppressors (i.e., first ringing suppressor 130 and second ringing suppressor 145) may be employed in the input of FDX amplifier 100 for each branch (i.e., first branch 105 and second branch 110).

FDX amplifier 100 may be deployed in an HFC network. US traffic signals may enter FDX amplifier 100 at first coupler 115 from, for example, downstream cable modems served by the HFC. Via first branch 105, FDX amplifier 100 may amplify the US traffic signals and may send them from second coupler 120 to a Cable Modem Termination System (CMTS) at a headend operated by the MSO. Likewise, DS traffic signals may enter FDX amplifier 100 at second coupler 120 from, for example, the CMTS. Via second branch 110, FDX amplifier 100 may amplify the DS traffic signals and may send them from first coupler 115 to the downstream cable modems served by the HFC.

Figure 1B:
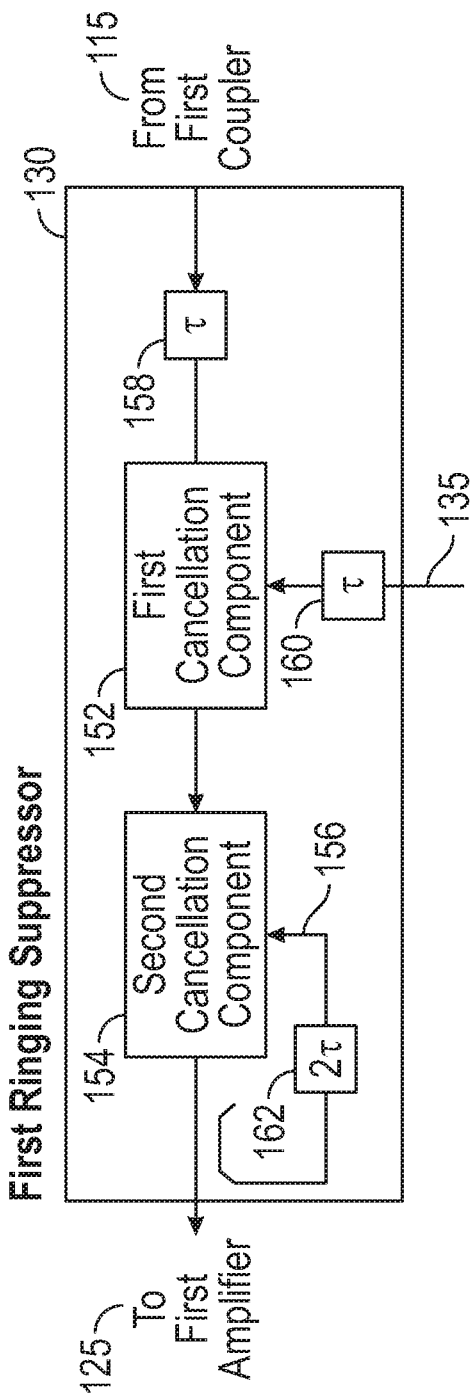
FIG. 1B is a block diagram of a first ringing suppressor.

FIG. 1B shows first ringing suppressor 130 in more detail. As shown in FIG. 1B, first ringing suppressor 130 may operate on US traffic and may comprise a first ringing suppressor first cancelation component 152, a first ringing suppressor second cancelation component 154, a first ringing suppressor ringing suppressor reference coupler 156, a first ringing suppressor first delay element 158, a first ringing suppressor second delay element 160, and a first ringing suppressor third delay element 162. First ringing suppressor first cancelation component 152 and first ringing suppressor second cancelation component 154 may be embodied in hardware and/or in software (including firmware, resident software, micro-code, etc.).

Figure 1C:
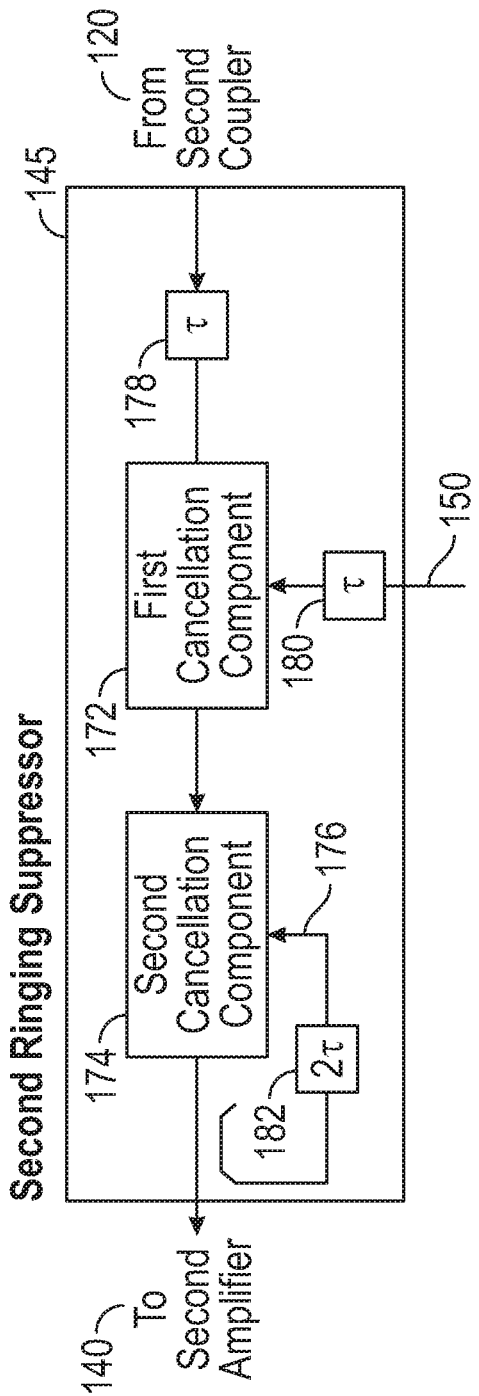
FIG. 1C is a block diagram of a second ringing suppressor.

Similar to first ringing suppressor 130, FIG. 1C shows second ringing suppressor 145 in more detail. As shown in FIG. 1C, second ringing suppressor 145 may operate on DS traffic and may comprise a second ringing suppressor first cancelation component 172, a second ringing suppressor second cancelation component 174, a second ringing suppressor ringing suppressor reference coupler 176, a second ringing suppressor first delay element 178, a second ringing suppressor second delay element 180, and a second ringing suppressor third delay element 182. Second ringing suppressor first cancelation component 172 and second ringing suppressor second cancelation component 174 may be embodied in hardware and/or in software (including firmware, resident software, micro-code, etc.).

Figure 3:
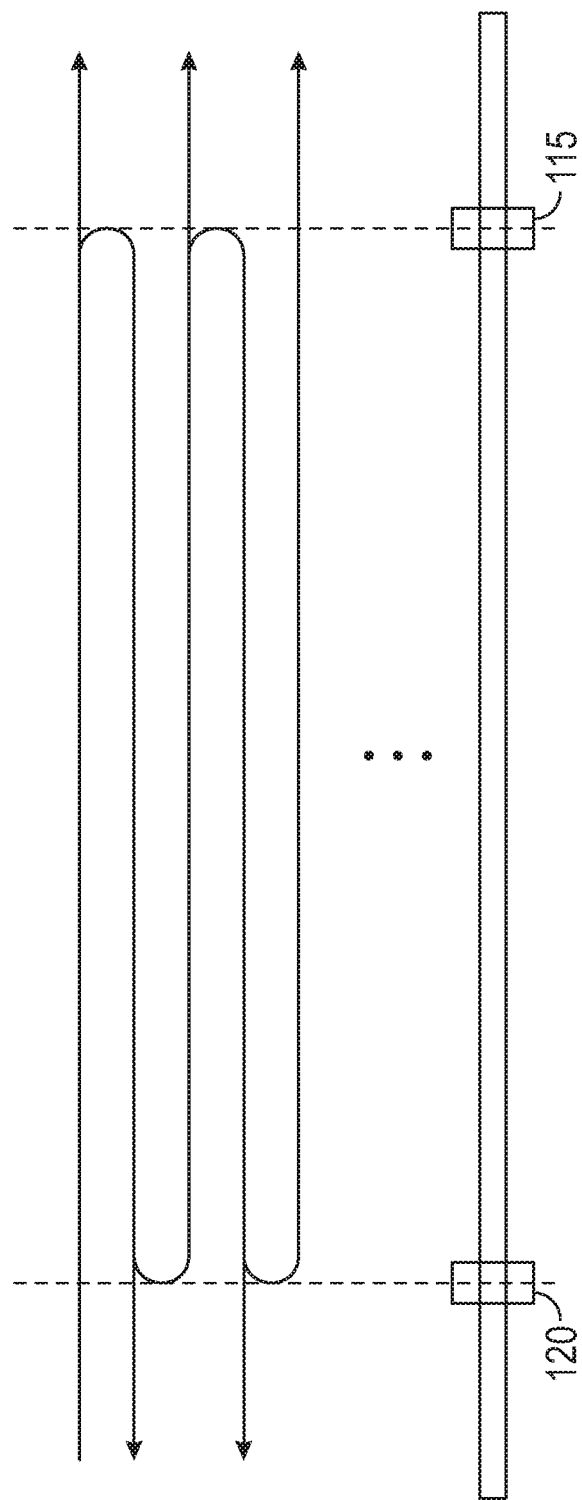
FIG. 3 illustrates signal ringing.

A transmitted signal on first branch 105 or on second branch 110 may loop back via two paths for example. The first path may be through port coupling of the combiner/coupler combiner/splitter (i.e., first coupler 115 and second coupler 120). The second path may be through multiple reflections (i.e., signal ringing) at taps/splitters (i.e., first coupler 115 and second coupler 120) as illustrated by FIG. 3. Discontinuities, may be inevitably present in a cable network (i.e. limited return loss of tap/splitter, etc.), and cause signal bouncing between them (i.e., signal ringing) as shown in FIG. 3. Signal ringing may comprise the main source of the interferences between transmitter and receiver in FDX operation.

The gain of FDX amplifier 100 may be ~30 dB, and the isolation between two output ports of combiner/coupler (i.e., first coupler 115 and second coupler 120) may be ~30 dB. So, the feedback signal through combiner port coupling (i.e., first coupler 115 and second coupler 120) may be 30 dB below the main signal, which comparing to the interference resulting from the ringing (see below), may contribute only a small portion of the total interference. However, feedback through ringing may be more dominant. The nominal return loss of a tap is ~20 dB, with an additional 4 dB loss of cable/combiner, the reflected signal may be 6 dB above the desired signal on the other branch of the amplifier. Similar to transceiver reflection cancellation, the performance of a ringing suppressor may be limited by the dynamic range of an Analog to Digital Converter (ADC). The max interference that can be cancelled out may be 13 dB above a desired signal given 10 bits Effective number of bits (ENOB) of the ADC.

Figure 2:
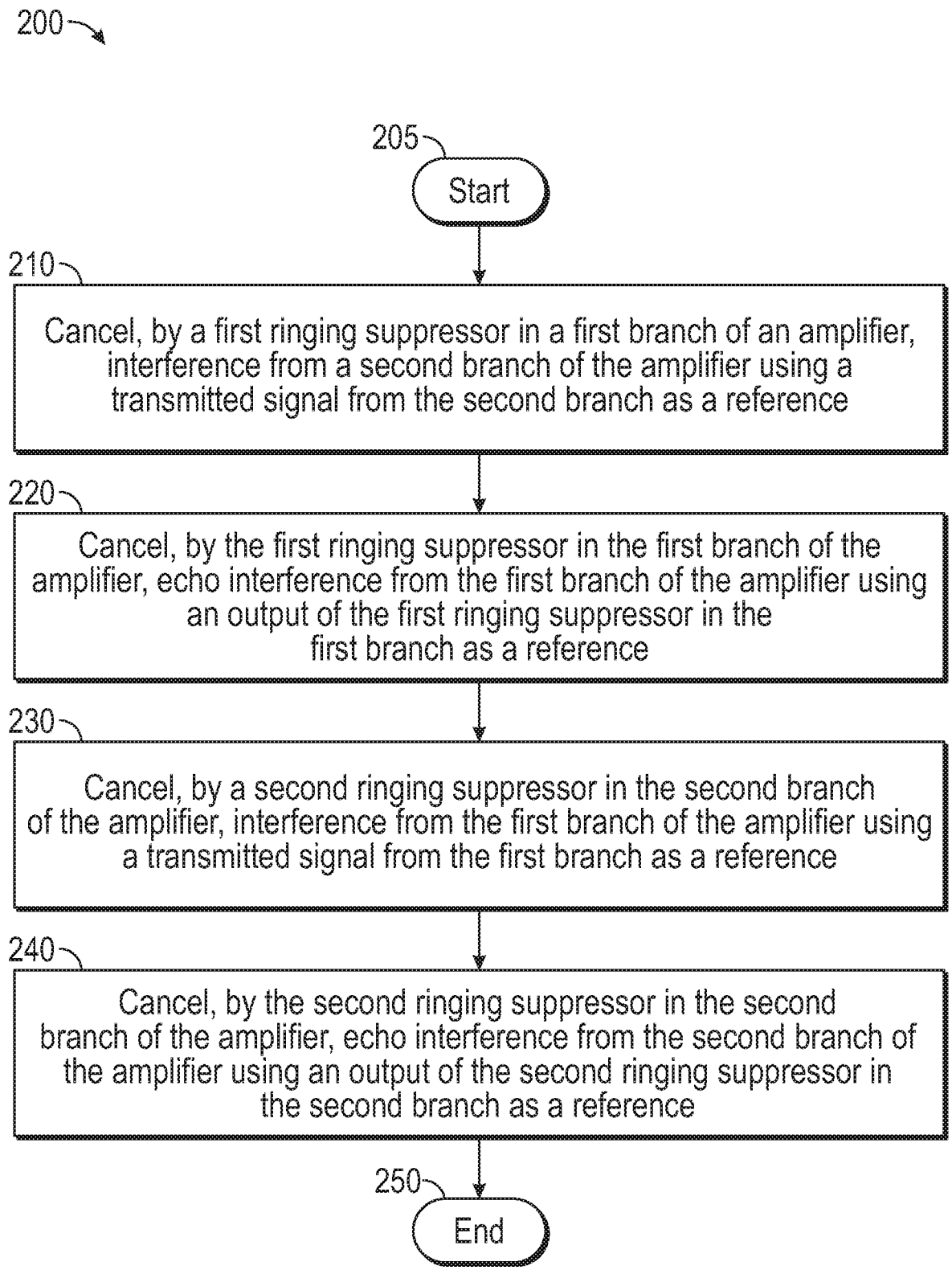
FIG. 2 is a flow chart of a method for providing ringing suppression.

FIG. 2 is a flow chart setting forth the general stages involved in a method 200 consistent with an embodiment of the disclosure for providing ringing suppression. Method 200 may be implemented using FDX amplifier 100 as described in more detail above with respect to FIG. 1A. Ways to implement the stages of method 200 will be described in greater detail below. Consistent with embodiments of the disclosure, there may be two stages of cancellations implemented in a ringing suppressor for a given branch. Stages 210 and 220 may illustrate these two stages respectively for first branch 105 and stages 230 and 240 illustrate these two stages respectively for second branch 110.

Method 200 may begin at starting block 205 and proceed to stage 210 where first ringing suppressor 130 in first branch 105 of FDX amplifier 100 may cancel interference from second branch 110 of FDX amplifier 100 using a transmitted signal from second branch 110 as a reference. For example, embodiments of the disclosure may use Active Interference Cancellation (AIC) to cancel out the interferences from other branch. First ringing suppressor first cancelation component 152 may receive the transmitted signal from second branch 110 as a reference via second branch reference coupler 135. First ringing suppressor first cancelation component 152 may use the transmitted signal from second branch 110 to apply AIC as described in greater detail be low with respect to FIG. 4. The cancellation performance target may be to suppress the interferences to a few dB below the desired signal.

From stage 210, where first ringing suppressor 130 in first branch 105 of FDX amplifier 100 cancels interference from second branch 110 of FDX amplifier 100 using a transmitted signal from second branch 110 as a reference, method 200 may advance to stage 220 where first ringing suppressor 130 in first branch 105 of FDX amplifier 100 may cancel echo interference from first branch 105 of FDX amplifier 100 using an output of first ringing suppressor 130 in first branch 105 as a reference. For example, some of the interference residue resulting after stage 210 may loop back to second branch 110 of FDX amplifier 100 where it may be suppressed. The echoes from first branch 105 may be cancelled. First ringing suppressor second cancelation component 154 may use AIC, but the reference used may comprise the output signal of first ringing suppressor 130 supplied by first ringing suppressor ringing suppressor reference coupler 156. To enable the echo cancelation, a delay may be added on first branch 105 to ensure all the reflections may be distinctive from the main signal in time so they can be suppressed with the echo cancellation process (i.e., AIC process). The delays, for example, may be added by first ringing suppressor first delay element 158, first ringing suppressor second delay element 160, and first ringing suppressor third delay element 162.

Once first ringing suppressor 130 in first branch 105 of FDX amplifier 100 cancels echo interference from first branch 105 of FDX amplifier 100 using an output of first ringing suppressor 130 in first branch 105 as a reference in stage 220, method 200 may continue to stage 230 where second ringing suppressor 145 in second branch 110 of FDX amplifier 100 may cancel interference from first branch 105 of FDX amplifier 100 using a transmitted signal from first branch 105 as a reference. For example, embodiments of the disclosure may use AIC to cancel out the interferences from other branch. Second ringing suppressor first cancelation component 172 may receive the transmitted signal from first branch 105 as a reference via second branch reference coupler 150. Second ringing suppressor first cancelation component 172 may use the transmitted signal from first branch 105 to apply AIC as described in greater detail be low with respect to FIG. 4. The cancellation performance target may be to suppress the interferences to a few dB below the desired signal.

After second ringing suppressor 145 in second branch 110 of FDX amplifier 100 cancels interference from first branch 105 of FDX amplifier 100 using a transmitted signal from first branch 105 as a reference in stage 230, method 200 may proceed to stage 240 where second ringing suppressor 145 in second branch 110 of FDX amplifier 100 may cancel echo interference from second branch 110 of FDX amplifier 100 using an output of second ringing suppressor 145 in second branch 110 as a reference. For example, some of the interference residue resulting after stage 230 may loop back to first branch 105 of FDX amplifier 100 where it may be suppressed. The echoes from second branch 110 may be cancelled. Second ringing suppressor second cancelation component 174 may use AIC, but the reference used may comprise the output signal of second ringing suppressor 145 supplied by second ringing suppressor ringing suppressor reference coupler 176. To enable the echo cancelation, a delay may be added on second branch 110 to ensure all the reflections may be distinctive from the main signal in time so they can be suppressed with the echo cancellation process (i.e., AIC process). The delays, for example, may be added by second ringing suppressor first delay element 178, second ringing suppressor second delay element 180, and second ringing suppressor third delay element 182. Once second ringing suppressor 145 in second branch 110 of FDX amplifier 100 cancels echo interference from second branch 110 of FDX amplifier 100 using an output of second ringing suppressor 145 in second branch 110 as a reference in stage 240, method 200 may then end at stage 250.

Figure 4:
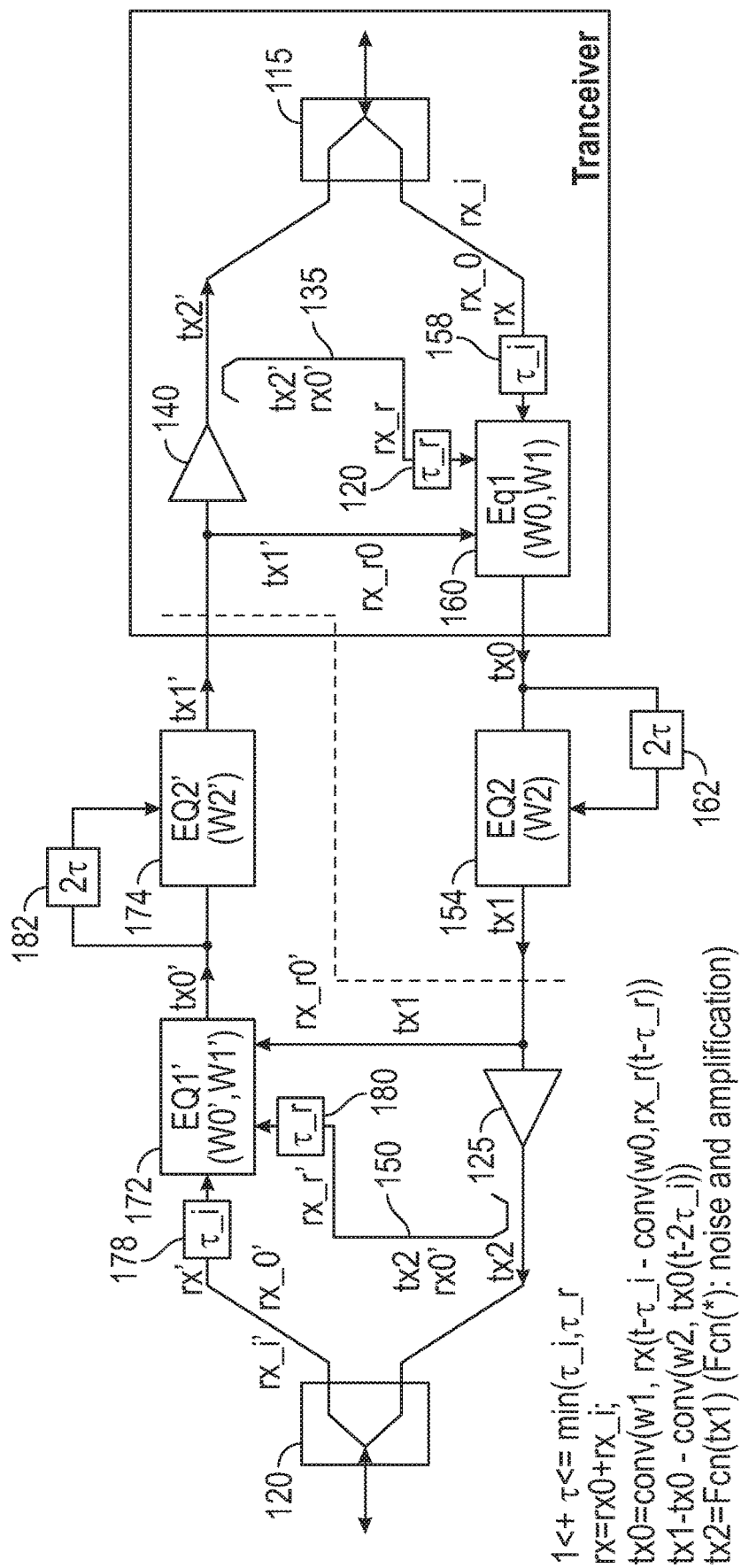
FIG. 4 illustrates signal flows in the ringing suppressors.

FIG. 4 illustrates signal flows in the ringing suppressors per Table 1 below.

on processing unit 710, software module 720 may perform, for example, processes for providing ringing suppression, including for example, any one or more of the stages from method 200 described above with respect to FIG. 2. Computing device 700, for example, may provide an operating environment for any of first ringing suppressor first cancelation component 152, first ringing suppressor second cancelation component 154, second ringing suppressor first cancelation component 172, and second ringing suppressor second cancelation component 174. Any of first ringing suppressor first cancelation component 152, first ringing suppressor second cancelation component 154, second ringing suppressor first cancelation component 172, and second

TABLE 1

| Signals | Relationship | Note | Channel |
|---|---|---|---|
| rx0 | desired signal | received desired signal | ideal BB signal, HFC channel |
| rx_i | rx_i = tx2a | received interferences | 2:1 combiner + HFC channel |
| rx | rx = rx0 + c1*rx_i | total received signal | |
| rx_r | rx_r = tx2a + c2*rx0a | received RF reference signal | hardware channel |
| rx_r0 | rx_r0 = tx1a | received BB reference signal | no additional channel |
| tx0 | | transmitted signal after first interference cancellation | no additional channel |
| tx1 | | transmitted signal after second interference cancellation | no additional channel |
| tx2 | | transmitted RF signal | Nonlinear channel, noise |
| rx0a | desired signal | received desired signal | ideal BB signal, HFC channel |
| rx_ia | rx_ia = tx2 | received interferences | 2:1 combiner + HFC channel |
| rxa | rx = rx0a + c1a*rx_ia | total received signal | hardware channel |
| rx_ra | rx_ra = tx2 + c2a*rx0 | received RF reference signal | hardware channel |
| rx_r0a | rx_r0a = tx1 | received BB reference signal | no additional channel |
| tx0a | | transmitted signal after first interference cancellation | no additional channel |
| tx1a | | transmitted signal after second interference cancellation | no additional channel |
| tx2a | | transmitted RF signal | Nonlinear channel, noise |

Each path generates 4 signals: rx, tx0, tx1, and tx2, and receives three signals, rx_i, rx_r, rx_r0, from the other path.
c1, c2, c1a, and c2a are constants(scaling factors)

Figure 5:
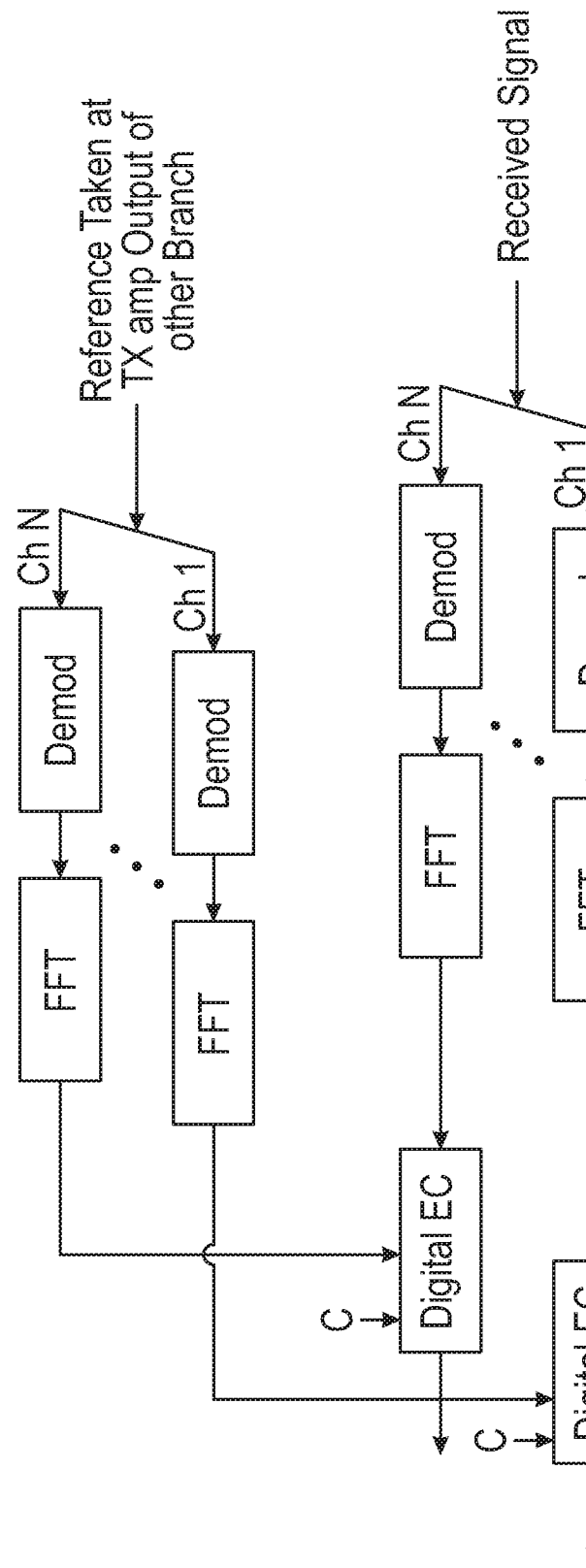
FIG. 5 illustrates Active Interference Cancellation (AIC)

FIG. 5 illustrates Active Interference Cancellation (AIC). The channel coef c may be computed in the frequency domain on a per subc base and from the following two signals: r—the reference signal taken at the output of the amplifier of the other branch; and s—the received signal. The channel coefs c, may be computed offline, in non-real time. The channel coef c may need to be updated once every N ms (i.e., update rate can be dynamically adjusted). For each subc, the EC coef may be computed as follows:

$$EC\ coef\ c = \text{average}(s/r);$$

where r is the reference signal taken at the DAC input after the delay t; and s is the received signal. r and s are complex numbers computed on each subc (frequency domain).

Length of moving average: With US quiet period (no US traffics), the average runs over the quiet period (US frame length). Without US quiet period, the average needs to run with >10^5 symbols (4 seconds, with 40 us symbol length), 50 dB suppression.

Figure 6:
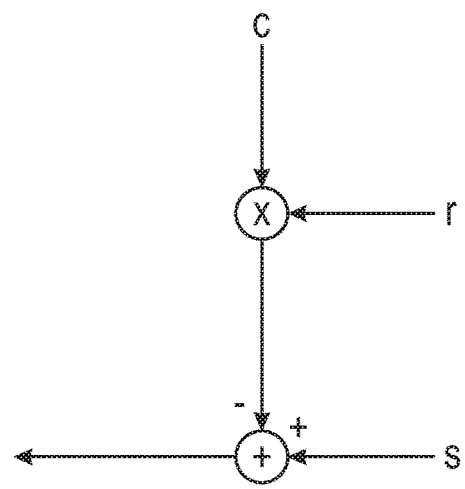
FIG. 6 Digital Echo Cancellation (EC)

FIG. 6 illustrates Digital Echo Cancellation (EC). The digital EC may be done in frequency domain on each subcarrier. r: the reference signal from the input of the DAC after the delay t, s: the received signal, and c: channel coef, a complex value.

Figure 7:
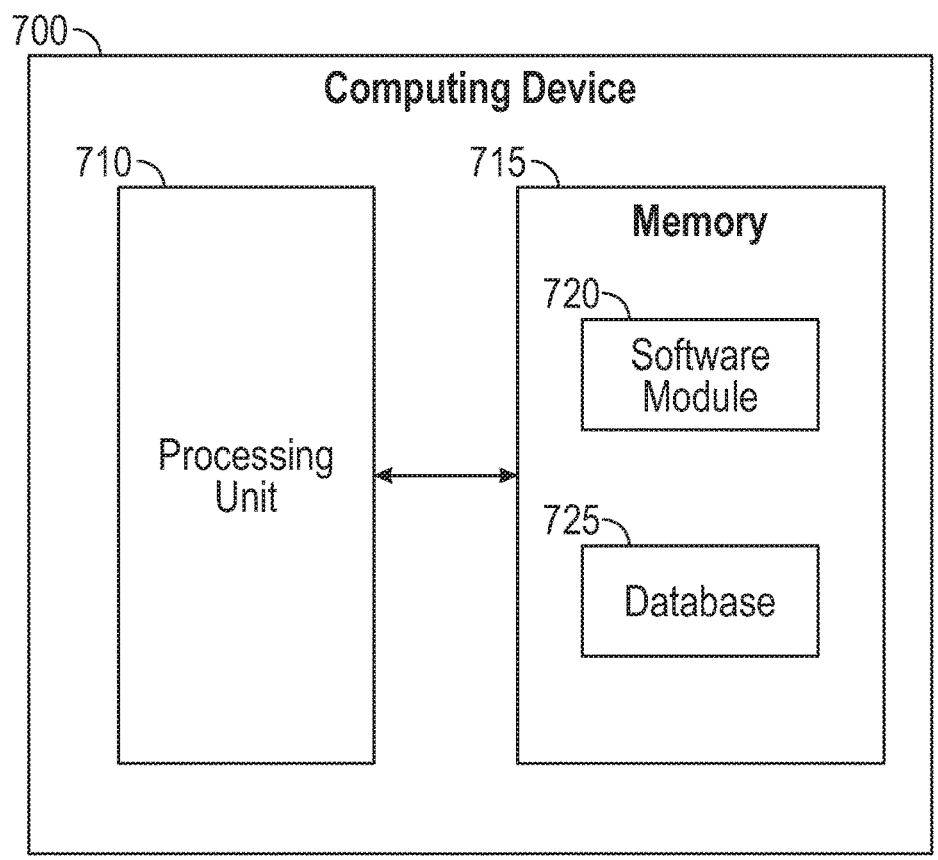
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing ringing suppressor second cancelation component 174 may operate in other environments and are not limited to computing device 700.

Computing device 700 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
canceling, by a first ringing suppressor in a first branch of an amplifier, interference from a second branch of the amplifier using a transmitted signal from the second branch as a reference, wherein the amplifier comprises a Full Duplex (FDX) Amplifier, wherein upstream signals and downstream signals simultaneously use a same frequency spectrum, and wherein canceling the interference from the second branch of the amplifier using the transmitted signal from the second branch as the reference comprises:
  receiving, by the first ringing suppressor in the first branch of the amplifier, the transmitted signal from the second branch of the amplifier,
  determining, by the first ringing suppressor in the first branch of the amplifier, a channel coefficient for a signal of the first branch of the amplifier using the transmitted signal from the second branch of the amplifier, wherein determining the channel coefficient comprises determining a moving average of the signal of the first branch of the amplifier divided by the transmitted signal received from the second branch of the amplifier, and
  canceling, using the channel coefficient, the interference from the second branch of the amplifier; and
canceling, by the first ringing suppressor in the first branch of the amplifier, echo interference from the first branch of the amplifier using an output of the first ringing suppressor in the first branch as a reference.

2. The method of claim 1, wherein canceling the interference from the second branch of the amplifier comprises canceling the interference from the second branch of the amplifier to less than 2 dB below a desired signal.

3. The method of claim 1, further comprising:
canceling, by a second ringing suppressor in the second branch of the amplifier, interference from the first branch of the amplifier using a transmitted signal from the first branch as a reference; and
canceling, by the second ringing suppressor in the second branch of the amplifier, echo interference from the second branch of the amplifier using an output of the second ringing suppressor in the second branch as a reference.

4. The method of claim 3, further comprising adding a delay in the first branch and adding a delay in the second branch to respectively make the echo interference from the first branch distinctive and the echo interference from the second branch distinctive.

5. The method of claim 3, wherein canceling the interference from the first branch of the amplifier comprises canceling the interference from the first branch of the amplifier to less than 2 dB below a desired signal.

6. The method of claim 3, wherein:
canceling interference from the first branch of the amplifier comprises using Active Interference Cancellation (AIC); and
canceling echo interference from the second branch of the amplifier comprises using AIC.

7. The method of claim 1, wherein:
canceling interference from the second branch of the amplifier comprise using Active Interference Cancellation (AIC); and
canceling echo interference from the first branch of the amplifier comprises using AIC.

8. The method of claim 1, wherein the first branch corresponds to an upstream signal.

9. The method of claim 1, wherein the second branch corresponds to a downstream signal.

10. An apparatus comprising:
a first ringing suppressor in a first branch of an amplifier, wherein the amplifier comprises a Full Duplex (FDX) Amplifier, wherein upstream signals and downstream signals simultaneously use a same frequency spectrum, and wherein the first ringing suppressor is configured to:
cancel interference from a second branch of the amplifier using a transmitted signal from the second branch as a reference, wherein the first ringing suppressor being configured to cancel the interference from the second branch of the amplifier using the transmitted signal from the second branch as the reference comprises the first ringing suppressor being configured to:
receive the transmitted signal from the second branch of the amplifier,
determine a channel coefficient for a signal of the first branch of the amplifier using the transmitted signal from the second branch of the amplifier, wherein the channel coefficient is determined as a moving average of the signal of the first branch of the amplifier divided by the transmitted signal received from the second branch of the amplifier, and
cancel, using the channel coefficient, the interference from the second branch of the amplifier, and
cancel echo interference from the first branch of the amplifier using an output of the first ringing suppressor in the first branch as a reference; and
a second ringing suppressor in the second branch of the amplifier, the second ringing suppressor configured to:
cancel interference from the first branch of the amplifier using a transmitted signal from the first branch as a reference, and
cancel echo interference from the second branch of the amplifier using an output of the second ringing suppressor in the second branch as a reference.

11. The apparatus of claim 10, wherein the first ringing suppressor and the second ringing suppressor are respectively configured to add a delay in the first branch and add a delay in the second branch to respectively make the echo interference from the first branch distinctive and the echo interference from the second branch distinctive.

12. The apparatus of claim 10, wherein the first branch corresponds to an upstream signal.

13. The apparatus of claim 10, wherein the second branch corresponds to a downstream signal.

14. A non-transitory computer-readable medium that stores a set of instructions which when executed perform a method comprising:
canceling, by a first ringing suppressor in a first branch of an amplifier, interference from a second branch of the amplifier using a transmitted signal from the second branch as a reference, wherein the amplifier comprises a Full Duplex (FDX) amplifier, wherein upstream signals and downstream signals simultaneously use a same frequency spectrum, and wherein canceling the interference from the second branch of the amplifier using the transmitted signal from the second branch as the reference comprises:
receiving, by the ringing suppressor in the first branch of the amplifier, the transmitted signal from the second branch of the amplifier,
determining, by the ringing suppressor in the first branch of the amplifier, a channel coefficient for a signal of the first branch of the amplifier using the transmitted signal from the second branch of the amplifier, wherein determining the channel coefficient comprises determining a moving average of the signal of the first branch of the amplifier divided by the transmitted signal received from the second branch of the amplifier and
canceling, using the channel coefficient, the interference from the second branch of the amplifier;
canceling, by the first ringing suppressor in the first branch of the amplifier, echo interference from the first branch of the amplifier using an output of the first ringing suppressor in the first branch as a reference;
canceling, by a second ringing suppressor in the second branch of the amplifier, interference from the first branch of the amplifier using a transmitted signal from the first branch as a reference; and
canceling, by the second ringing suppressor in the second branch of the amplifier, echo interference from the second branch of the amplifier using an output of the second ringing suppressor in the second branch as a reference.

15. The non-transitory computer-readable medium of claim 14, further comprising adding a delay in the first branch and adding a delay in the second branch to respectively make the echo interference from the first branch distinctive and the echo interference from the second branch distinctive.

16. The non-transitory computer-readable medium of claim 14, wherein the first branch corresponds to an upstream signal.

17. The non-transitory computer-readable medium of claim 14, wherein the second branch corresponds to a downstream signal.

18. The non-transitory computer readable medium of claim 14, wherein:
canceling interference from the first branch of the amplifier comprises using Active Interference Cancellation (AIC); and
canceling echo interference from the second branch of the amplifier comprises using AIC.

19. The non-transitory computer readable medium of claim 14, wherein:

canceling interference from the second branch of the amplifier comprise using Active Interference Cancellation (AIC); and canceling echo interference from the first branch of the amplifier comprises using AIC.

20. The non-transitory computer readable medium of claim 14, wherein canceling the interference from the first branch of the amplifier comprises canceling the interference from the first branch of the amplifier to less than 2 dB below a desired signal.

* * * * *